United States Patent
Baluja et al.

(10) Patent No.: US 8,611,617 B1
(45) Date of Patent: Dec. 17, 2013

(54) SIMILAR IMAGE SELECTION

(75) Inventors: Shumeet Baluja, Santa Clara, CA (US);
Michele Covell, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 243 days.

(21) Appl. No.: 13/174,289

(22) Filed: Jun. 30, 2011

Related U.S. Application Data (60) Provisional application No. 61/372,079, filed on Aug. 9, 2010.

(51) Int. Cl.
*G06K 9/00* (2006.01)
*G06K 9/62* (2006.01)

(52) U.S. Cl.
USPC .......................................... 382/124; 382/224

(58) Field of Classification Search
USPC .......... 382/124, 159, 209, 218, 224, 305, 118
See application file for complete search history.

(56) References Cited

U.S. PATENT DOCUMENTS

| | | | | |
|---|---|---|---|---|
| 8,015,124 B2 * | 9/2011 | Milo et al. | | 706/12 |
| 8,144,947 B2 * | 3/2012 | Kletter | | 382/124 |
| 8,369,407 B2 * | 2/2013 | Saoudi et al. | | 375/240.16 |
| 2006/0271947 A1 * | 11/2006 | Lienhart et al. | | 725/19 |
| 2010/0246960 A1 * | 9/2010 | Kim | | 382/176 |

OTHER PUBLICATIONS

Baluja, S., et al., "Beyond "Near-Duplicates": Learning Hash Codes for Efficient Similar-Image Retrieval" ICPR'10, International Conference on Pattern Recognition, Aug. 20, 2010, pp. 543-547.
Barnes, C., et al., "PatchMatch: A Randomized Correspondence Algorithm for Structural Image Editing," ACM Transactions on Graphics (Proc. SIGGRAPH), Aug. 2009, 10 pages.
Cui, J., et al., "Example-Based Image Commpression," 17th IEEE International Conference on Image Processing (ICIP), 2010, 4 Pages.
Datar, M., et al., "Locality Sensitive Hashing Scheme Based on p-Stable Distributions," SoCG'04, Jun. 9-11, 2004, New York, USA, ACM, 10 Pages.
Grundmann, M., et al., "Efficient Hierarchical Graph-Based Video Segmentation," CVPR, 2010, pp. 1-8.

(Continued)

*Primary Examiner* — Daniel Mariam
(74) *Attorney, Agent, or Firm* — Turocy & Watson, LLP (57) ABSTRACT

An image similar to a target image is selected from among a set of candidate images. A set of image classifiers is first generated and used to create a fingerprint for each candidate image. A hash table is generated for each fingerprint segment, and an identifier for each candidate image is stored in each hash table based on the candidate image fingerprint value for the fingerprint segment associated with the hash table. A fingerprint is created for the target image using the set of classifiers. Segments of the target image fingerprints are compared to segments of the candidate image fingerprints using the hash table, and a candidate image similar to the target image is selected based on this comparison.

24 Claims, 8 Drawing Sheets

(56) References Cited

OTHER PUBLICATIONS

Khan, A., et al., "Content Classification Based on Objective Video Quality Evaluation for MPEG4 Video Streaming over Wireless Networks," Proceedings of the World Congress on Engineering 2009, vol. I WCE 2009, Jul. 1-3, 2009, London, U.K., 6 pages.

Kleinberg, J., et al., "Algorithm Design," Chapter 1, Introduction: Some Representative Problems, Pearson Education Inc., 2006, 13 pages.

MacQueen, J. B., "Some Methods for classification and Analysis of Multivariate Observations," Proceedings of 5-th Berkeley Symposium on Mathematical Statistics and Probability, 1967, Berkeley, University of California Press, vol. 1, pp. 281-297.

Shlens, J., "A Tutorial on Principal Component Analysis-Derivation, Discussion and Singular Value Decomposition," Mar. 25, 2003, PCA-Tutorial-Intuition, Version 1, pp. 1-16, available at <URL:http://www.cs.princeton.edu/picasso/mats/PCA-Tutorial-Intuition_jp.pdf>.

Yianilos, P., "Data Structures and Algorithms for Nearest Neighbor Search in General Metric Spaces," NEC Research Institute Technical Report Fourth, Jun. 1992, 11 pages.

\* cited by examiner

| Image Class | Image Class Index | | | | |
|---|---|---|---|---|---|
| | 0000000000 | 0000000001 | 0000000010 | 0000000011 | .... |
| 1: Cars | .95 | 0 | .05 | 0 | .... |
| 2: Horses | 0 | 1.0 | 0 | 0 | .... |
| 3: Ninjas | .12 | .15 | .30 | .43 | .... |
| 4: Candy | .35 | 0 | .25 | .40 | .... |
| .... | .... | .... | .... | .... | .... |

FIG. 7

| 20-bit Sequence | Candidate images w/ 20-bit fingerprint sequence |
|---|---|
| 0000 .... 0000 | L308, P912, M17, B722, ... |
| 0000 .... 0001 | G131, R920, B615, A636, ... |
| 0000 .... 0010 | .... |
| 0000 .... 0011 | .... |
| 0000 .... 0100 | .... |
| .... | .... |
| 0101 .... 0111 | .... |
| 0101 .... 1000 | .... |
| .... | .... |
| 1111 .... 1100 | .... |
| 1111 .... 1101 | .... |
| 1111 .... 1110 | .... |
| 1111 .... 1111 | Y487, N21, O909, V444, ... |

SIMILAR IMAGE SELECTION

RELATED U.S. APPLICATION DATA

This application claims the benefit of U.S. Provisional Application 61/372,079, filed Aug. 9, 2010, the content of which is incorporated by reference herein in its entirety.

BACKGROUND

1. Field of Disclosure

This disclosure relates to digital images and in particular to selecting an image similar to another image.

2. Description of the Related Art

The ability to select an image similar to a second image from a large database has a wide variety of applications, such as searching-by-example within image sets, example-based image compression, and texture synthesis. In some instances, a database may contain millions of images, increasing the computational complexity required to select a similar image. In each of these applications, selecting the image most similar to a target image from a distributed database of images as efficiently as possible is desirable. However, processing images in large image databases is computationally demanding and requires large amounts of bandwidth and memory resources. Further, comparing image file information between a target image and every image in a database requires even greater processing power, and does not account for varying image formats or resolutions. Thus, selecting an image similar to a second image is both difficult and resource-demanding.

SUMMARY

The above and other issues are addressed by a method, computer, and computer-readable storage medium storing instructions for selecting a candidate image similar to a target image. Embodiments of the method comprise generating a set of image classifiers. Fingerprints are generated for a set of candidate images using the set of image classifiers. Segments of the candidate image fingerprints are represented using hash tables. A fingerprint for the target image is generated using the classifiers, and segments of the target image fingerprint are compared to segments of the candidate image fingerprints represented by the hash tables. A candidate image similar to the target image is selected based on the comparison.

Embodiments of the computer comprise a non-transitory computer-readable storage medium storing executable computer program instructions for generating a set of image classifiers. The instructions generate fingerprints for a set of candidate images using the set of image classifiers. The instructions next represent segments of the candidate image fingerprints using hash tables. The instructions generate a fingerprint for the target image using the classifiers, and compare segments of the target image fingerprint to segments of the candidate image fingerprints represented by the hash tables. Finally, the instructions select a candidate image similar to the target image based on the comparison. The computer additionally comprises a processor for executing the computer program instructions.

Embodiments of the computer-readable storage medium store executable computer program instructions for generating a set of image classifiers. The instructions generate fingerprints for a set of candidate images using the set of image classifiers. The instructions represent segments of the candidate image fingerprints using hash tables. The instructions generate a fingerprint for the target image using the classifiers, and compare segments of the target image fingerprint to segments of the candidate image fingerprints represented by the hash tables. Finally, the instructions select a candidate image similar to the target image based on the comparison.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
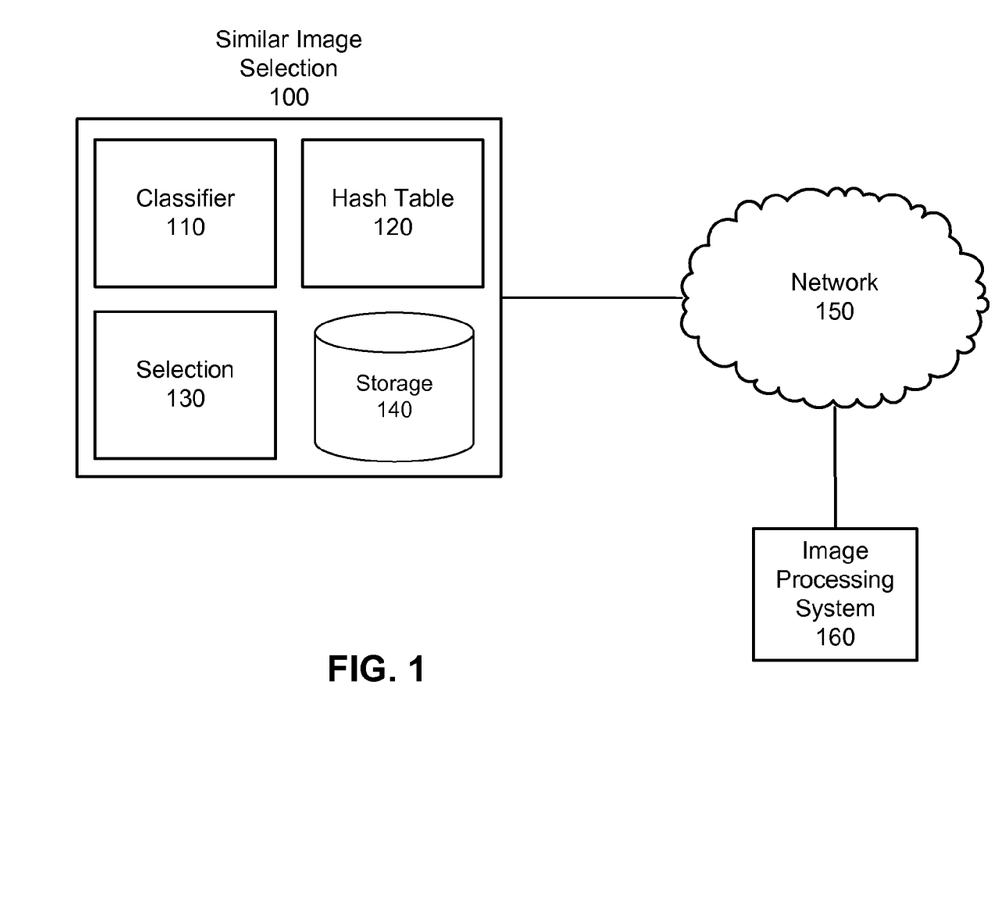
FIG. 1 is a high-level block diagram illustrating a similar image selection system for selecting an image similar to a target image according to one embodiment.

FIG. 1 is a high-level block diagram illustrating a similar image selection system 100 for selecting a similar image according to one embodiment. As shown, the system includes a classifier module 110, a hash table module 120, a selection module 130, and a storage module 140. In addition, the similar image selection system 100 may optionally be communicatively coupled to an image processing system 160 through a network 150. Only one image processing system 160 is illustrated in FIG. 1 in order to simplify and clarify the present description, but any number of image processing systems 160 may be coupled to similar image selection system 100. There can be other entities in the similar image selection system 100 as well.

The similar image selection system 100 selects an image similar to another image. In one embodiment, the similar image selection system 100 operates in three general phases. In the first phase, classifier module 110 generates and trains classifiers for use in classifying images. Next, hash table module 120 uses the classifiers generated by classifier module 110 to process candidate images and create hash tables which organize the candidate images based on their classification. Finally, selection module 130 classifies a target image using the classifiers generated by classifier module 110, retrieves candidate images with similar classifications as the target image using the hash tables generated by hash table module 120, and selects and image based on the retrieved candidate images.

During the training phase, classifier module 110 generates a set of image classifiers used to produce digital fingerprints for images. A classifier is a function that receives data as input, and outputs a value indicating whether the data have a specified property. In one embodiment, the classifier module 110 generates binary image classifiers that output binary values indicating whether input images have the specified properties. For instance, a binary image classifier that recognizes human faces in pictures outputs a "1" if a face is present, and a "0" if no face is present in an input image.

The classifiers generated by classifier module 110 may be weak classifiers, which classify images only slightly better than random classification. A weak classifier may be defined by determining a pair of averages from corner locations of two distinct rectangular regions in an image, performing an operation on the pair of averages (such as a ratio, a sum, or an absolute difference), and by utilizing a threshold value to reduce the result to a single bit. Further, the weak classifiers may be boosted to create strong classifiers. In one embodiment, a strong classifier is generated by using the AdaBoosting machine learning algorithm in conjunction with the weak classifiers. For each Adaboost step, multiple weak classifiers may be generated, and the classifier which best reduces residual error may be selected.

Multiple (N) classifiers are used in classifying a single image; the concatenated outputs of the multiple classifiers (an N-bit word) is referred to as the image's digital fingerprint. During the candidate image processing phase, hash table module 120 uses classifiers generated by classifier module 110 to produce digital fingerprints for a set of images that are candidates to be selected as a similar image ("candidate images"). Hash table module 120 may then generate a set of hash tables, one for each fingerprint segment, organizing the candidate images into the hash tables based on the binary sequences of the candidate image fingerprints at the particular fingerprint segment associated with each hash table.

During the selection phase, selection module 130 selects one or more images similar to a target image from among a set of candidate images. Selection module 130 may receive a target image from a locally stored image or video, or from image processing system 160 over network 150. In one embodiment, selection module 130 utilizes the classifiers generated by classifier module 110 and the hash tables generated by hash table module 120 in selecting an image similar to a target image. Selection module 130 may reference the hash tables to look up candidate images with fingerprint segments identical to the target image fingerprint, and may tally the number of common fingerprint segments for each candidate image. In such an embodiment, selection module 130 may select the candidate image with the most fingerprint segments in common with the target image fingerprint.

Storage module 140 stores classifiers generated by classifier module 110 and hash tables generated by hash table module 120. Further, storage module 140 may store training images used by classifier module 110 to generate classifiers, and may store candidate images organized by hash table module 120 into hash tables. Alternatively, the training images required by classifier module 110 and the candidate images required by hash table module 120 may be stored or generated by image processing system 160. Storage module 140 may also store target images and video used by selection module 130, and may store the images similar to target images selected by selection module 130. Storage module 140 may comprise one or more distinct storage modules.

Image processing system 160 uses similar images selected by the similar image selection system 100 to perform image processing. For example, image processing system 160 can use the similar images to encode and/or decode images, including still images and images from video frames. Another example of image processing system 160 is a web server providing a web site that supports similar image searching.

Image processing system 160 communicates with similar image selection system 100 via network 150. Network 150 enables communications between the similar image selection system 100 and image processing system 160. In one embodiment, the network 150 uses standard communications technologies and/or protocols and can include local and/or private networks, the Internet, and mobile telephone networks.

Figure 2:
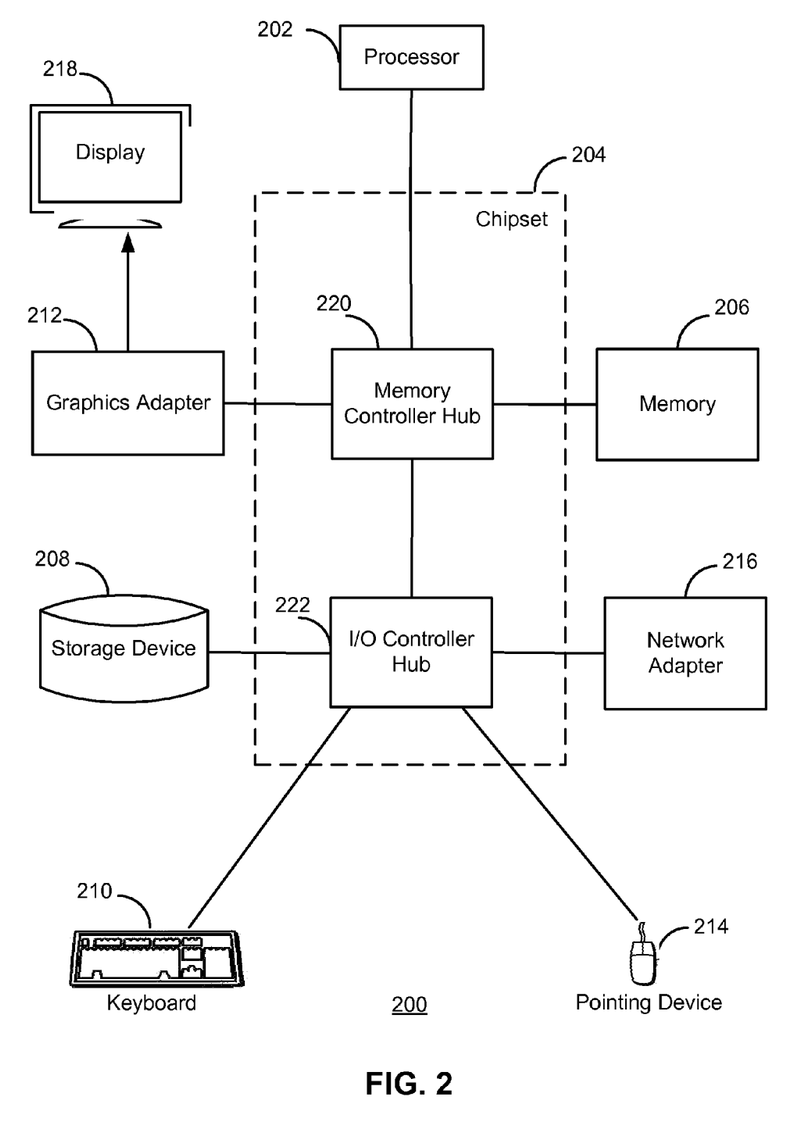
FIG. 2 is a high-level block diagram illustrating a typical computer for use in selecting an image similar to a target image according to one embodiment.

FIG. 2 is a high-level block diagram illustrating a typical computer 200 for use as similar image selection system 100 or image processing system 160. Illustrated are a processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222.

In one embodiment, the memory 206 is coupled directly to the processor 202 instead of the chipset 204, or is located within processor 202, such as in a system-on-a-chip environment. In such embodiments, the operating environment may lack certain components, such as chipset 204, storage device 208, keyboard 210, graphics adapter 212, pointing device 214, network adapter 216 and display 218. Processor 202 may be a special-purpose dedicated processor, such as an ASIC, or a customizable general-purpose processor, such as an FPGA. Processor 202 may also be a commercially available CPU or GPU, with one or more processor cores.

The storage device 208 is a non-transitory computer-readable storage medium, such as a hard drive, compact disk read-only memory (CD-ROM), DVD, or a solid-state memory device. The storage device 208 can be local and/or remote from the computer 200 (such as embodied within cloud storage). The memory 206 holds instructions and data used by the processor 202. The graphics adapter 212 displays images and other information on the display 218. The network adapter 216 couples the computer 200 to the network 150.

This description uses the term "module" to refer to computer program logic for providing a specified functionality. A module can be implemented in hardware, firmware, and/or software. A module is typically stored on a computer-readable storage medium such as the storage device 208, loaded into the memory 206, and executed by the processor 202.

Example Architectural Overview of the Similar Image Selection System

Figure 3:
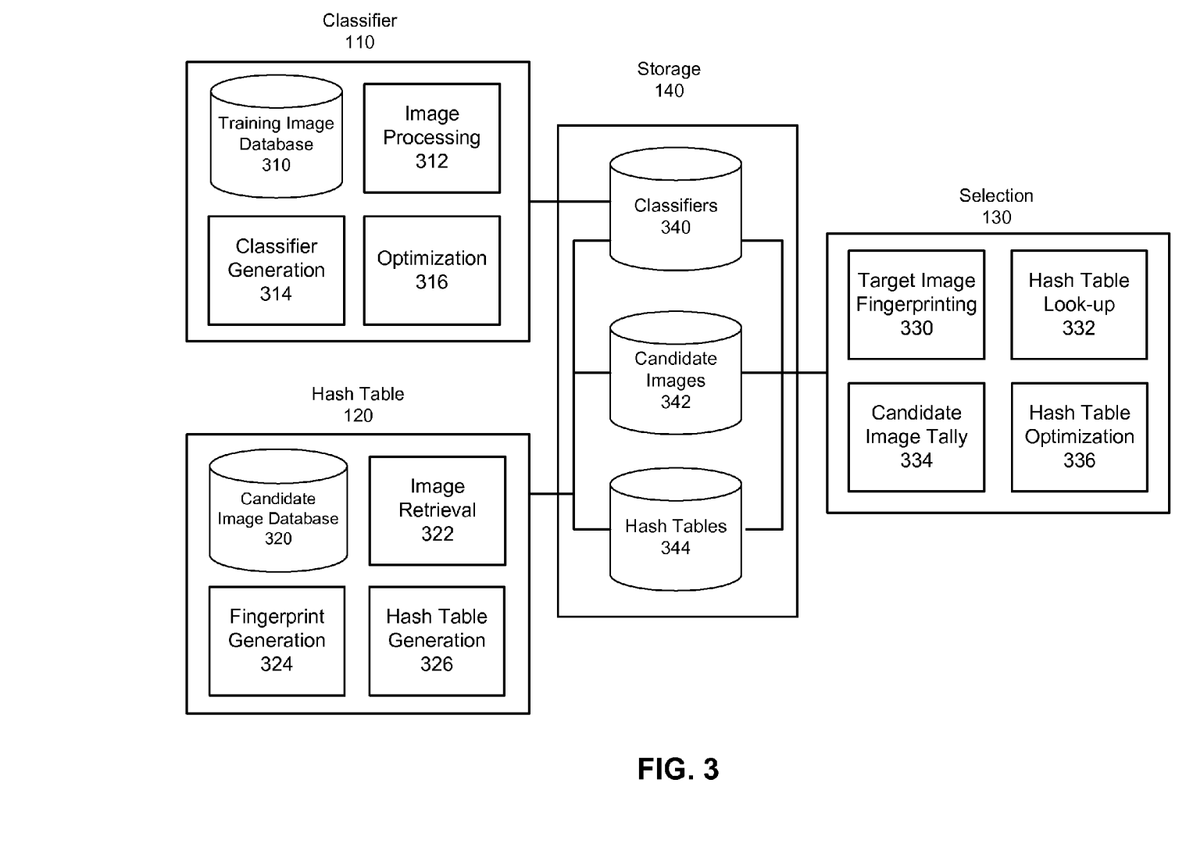
FIG. 3 is a block diagram illustrating the components of the similar image selection system of FIG. 1 according to one embodiment.

FIG. 3 is a block diagram illustrating the components of the similar image selection system 100 of FIG. 1 according to one embodiment. Some embodiments of the similar image selection system 100 have different and/or other modules than the ones described herein. Similarly, the functions can be distributed among the modules or can be performed by other entities in accordance with other embodiments in a different manner than is described here.

Classifier module 110 comprises training image database 310, image processing module 312, classifier generation module 314 and optimization module 316. Image processing module 312 retrieves a set of training images from training image database 310. In one embodiment, images in training image database 310 are organized into image classes. Examples of image classes may comprise "cars", "dogs", "islands" or the like; any identifiable subject matter classification of images may be utilized. Likewise, image classes may comprise images with similar image features, such as images containing similar color schemes, images containing particular shapes or patterns, images visibly similar to a randomly selected image, or images with any other common feature. Image classes may be designated manually by humans or automatically by computers. In one embodiment, training image database 310 stores images retrieved from the Internet. For instance, image processing module 312 may search for "cars" in an image search engine, and may use the retrieved the top 20 search results as one class of training images.

Image processing module 312 may retrieve multiple images per image class for multiple image classes. In one embodiment, image processing module 312 retrieves 10 images per image class for 1024 different image classes. Training image database 310 may store thousands or more image classes, with hundreds or more images for each image class. Image and image class selection may be random. For instance, image processing module 312 may randomly select image classes and images in each image class from images stored in training image database 310. Training image database 310 may have an image class index from which image processing module 312 may randomly select images and image classes. Alternatively, image processing module 312 may randomly select search query terms to enter into an image search engine, and may randomly select images among the image results.

Image processing module 312 randomly assigns each training image class an index. In one embodiment, image processing module 312 retrieves $2^N$ image classes and assigns each image class an N-bit index. After image classes are assigned an index, classifier generation module 314 generates a group of image classifiers. In one embodiment, classifier generation module 314 generates 10 classifiers. As discussed above with regards to FIG. 1, each generated classifier may classify an image as either a "1" or a "0", and concatenating image classifier outputs for an image results in a fingerprint for the image. For example, 10 classifiers may classify a particular image, and the classifier output results may be concatenated to form the fingerprint "1001011000".

In one embodiment, for N-bit image class indexes, classifier generation module 314 generates N classifiers. Classifier generation module 314 may attempt to generate classifiers so that when the images are classified, the output of the concatenated classifiers for each image is the assigned image class index of each image's image class. Generating classifiers to result in a fingerprint equivalent to an image's image class index for each image is referred to as "forcing" classification of an image class index. Image processing module 312 may classify all retrieved training images using the classifiers generated by classifier generation module 314, generating a fingerprint for each image.

Optimization module 316 determines the success of forcing classification of the randomly assigned image class indexes. Success may be determined through the use of a confidence table. In one embodiment, the rows of the confidence table may be image classes, and the columns of the confidence table may be the image class indexes. In such an embodiment, the confidence table entries are the confidence levels that an image class should be assigned a particular image class index. In one embodiment, confidence is numerical and measured on the interval [0, 1]. Confidence may be correlated to the number of classified images in an image class with a fingerprint equivalent to a particular class index. For example, if 9 classified images in the image class "cars" have the fingerprint "1001010001", this may result in a higher confidence table entry than if 4 images in the image class have the same fingerprint. Alternative factors may be considered in determining confidence, such as the distribution of the output of classifiers (for instance, the influence of a classifier that skewed toward one classification may be discounted), the number of image classes containing images with identical fingerprints, and the distribution or variance of digital fingerprints within an image class. An example of a confidence table is discussed below in greater detail with regards to FIG. 8.

Optimization module 316 reassigns image class indexes in an attempt to match image class indexes with the image fingerprints within each image class. In one embodiment, confidence tables generated by optimization module 316 are used to reassign image class indexes. In such an embodiment, a greedy algorithm may be used in reassigning indexes. The greedy algorithm assigns the image class with the highest confidence table entry to the image class index associated with the highest confidence table entry, removes the image class and index from consideration, and repeats the process until each image class is assigned an index. Alternatively, the Hungarian algorithm may be used in reassigning indexes. The Hungarian algorithm selects an unassigned image class and determines the strongest confidence table entry for the selected image class associated with an index that has not previously been considered by the selected image class. If the index associated with the confidence table entry is already tentatively assigned to a second image class, the algorithm determines whether or not the second image class has a higher confidence table entry for the index than the selected image class. If the selected image class has a higher confidence table entry, the index is tentatively assigned to the selected image class, and the previous tentative assignment to the second image class is broken off, removing the index from future consideration for the second image class. If the selected image class has a lower confidence table entry than the second image class for the index, the selected image class is not assigned to the index, and the index is removed from future consideration for the selected image class. This process is repeated until each image class is assigned to an index. Alternatively, any combinatorial optimization problem-solving algorithm may be implemented to reassign images classes to image class indexes.

Figure 7:
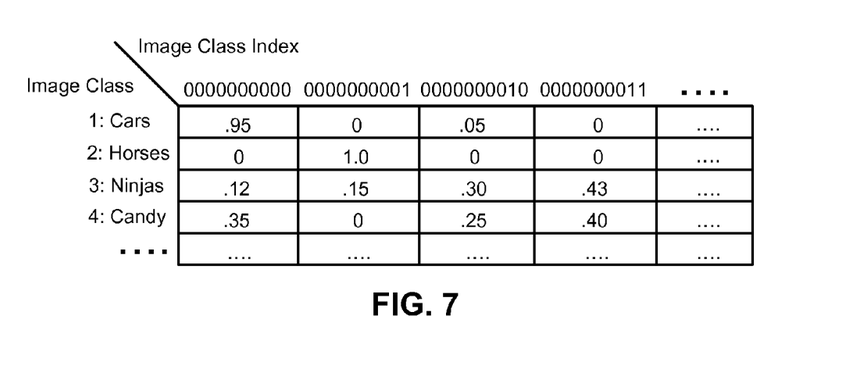
FIG. 7 is an example confidence table for image class index assignment and classifier generation, according to one embodiment.

FIG. 7 is an example confidence table for image class index assignment and classifier generation, according to one embodiment. In the embodiment of FIG. 7, various image classes have been selected and are assigned to confidence table rows. Visible are image classes "cars", "horses", "ninjas", and "candy". More index classes (not shown) may also be assigned to rows in the confidence table. 1024 or more image classes may be assigned to confidence table rows. Likewise, image class indexes are assigned to confidence table columns. In the embodiment of FIG. 7, four image class indexes are assigned to columns, but 1024 or more image class indexes may be assigned to columns. For example, the image class "cars" has a 0.95 confidence in being assigned to image class index "0000000000", a 0.05 confidence in being assigned to image class index "0000000010", and a 0.0 confidence in being assigned to any other image class index.

In the embodiment of FIG. 7, utilizing a greedy algorithm for the image classes and image class indexes shown, reassignment would result first in the "horses" image class being assigned to image class index "0000000001". Next, the "cars" image class would be assigned to image class index "0000000000". This would be followed by the "ninjas" image class being assigned to image class index "0000000011" and the "candy" image class being assigned to image class index "0000000010". In an embodiment with more than 4 image classes and image class indexes, the process will repeat until each image class is assigned to an image class index.

After optimization module 316 reassigns image class indexes to image classes, classifier generation module 314 generates new classifiers to try to force classification to the reassigned image class indexes. The generated new classifiers may comprise classifiers that have been previously generated, and may comprise classifiers that have not been previously generated. Using the generated new classifiers, image processing module 312 reclassifies the training images and optimization module 316 reassigns image class indexes to image classes. This process is repeated until a measure of confidence in the generated classifiers is met, and the group of classifiers is stored as a subset of the set of image classifiers. In one embodiment, the measure of confidence comprises a threshold of image class indexes assigned to different image classes in a given reassignment iteration. For instance, if less than 10% of the image class indexes are assigned to a different image class in one iteration, the process stops and the classifiers are stored. Alternative measures of confidence may include the variance and distribution of confidence table entries, or the passage of a certain amount of time or number of process iterations.

Once the first subset of classifiers have been generated and stored, additional subsets of classifiers are generated. For each new subset of classifiers generated, new training images and image classes are selected. As discussed above, the selection of images and image classes may be random, and as a result, the new training images and image classes can include previously selected images and image classes. For instance, in a pool of a billion images belonging to a million image classes, and selecting 1024 image classes per set of generated classifiers, there is a small chance that a particular image class will be selected more than once, and an even smaller chance that a particular image within the image class will be selected more than once. In one embodiment, lower image overlap corresponds with stronger classifiers. In one exemplary embodiment, each iteration of classifier generation generates 10 classifiers, and the process is repeated until 2000 classifiers are generated. After the set of classifiers is completely generated, the set of classifiers may be transmitted to classifier storage module 340.

Hash table module 120 may comprise candidate image database 320, image retrieval module 322, fingerprint generation module 324, and hash table generation module 326. Candidate image database 320 may comprise a standalone store of images. In one embodiment, candidate image database 320 stores images retrieved from the Internet. Image retrieval module 322 may retrieve a set of candidate images from candidate image database 320, and may store the set of candidate images in candidate image storage module 342. The similar image selected by selection module 130 is selected from the set of candidate images. Image retrieval module 322 may label each image in the set of candidate images with an image ID. In one embodiment, the image ID is an identifier unique to each image.

Fingerprint generation module 324 generates fingerprints for candidate images using the classifiers. Classifiers may be retrieved from classifiers storage module 340; alternatively, classifiers may be retrieved from classifier module 110 or elsewhere. In one embodiment, classifier module 110 produces 2000 classifiers, and fingerprint generation module 324 retrieves all 2000 classifiers. In alternative embodiments, fewer or more classifiers may be generated and/or retrieved. Fingerprint generation module 324 may apply the retrieved classifiers to the set of candidate images, concatenating the output of the retrieved classifiers to produce a fingerprint for each candidate image. For instance, if 2000 classifiers are retrieved and each candidate image is classified, a 2000-bit fingerprint is generated for each candidate image. Each fingerprint may comprise one or more fingerprint segments comprising a portion of the fingerprint. In one embodiment, the fingerprint segments are uniform in size for all candidate images. Further, each fingerprint may be divided into non-overlapping fingerprint segments. For example, if candidate image fingerprints are 2000 bits in length, each candidate image fingerprint may be identically divided into 100 20-bit fingerprint segments.

Hash table generation module 326 next generates hash tables for the fingerprint segments. In one embodiment, this comprises 100 hash tables, one for each 20-bit fingerprint segment. Alternatively, hash tables may be generated for just a portion of the fingerprint segments. The rows of each hash table may comprise every possible sequence of fingerprint segment ("segment sequence"). For example, if fingerprint segments are 20 bits in length, there may be $2^{20}$ hash table rows, one for each possible 20-bit sequence. Hash table generation module 326 then organizes each candidate image into each hash table. Organizing candidate images into a hash table may comprise determining the 20-bit segment represented by the hash table, determining the 20-bit sequence of each candidate image for the 20-bit segment, and inserting each image's image ID into the row of the hash table representing the 20-bit sequence. This process may be repeated for all candidate images and all hash tables. Once the hash tables are generated, they may be stored in hash table storage module 344.

Figure 8:
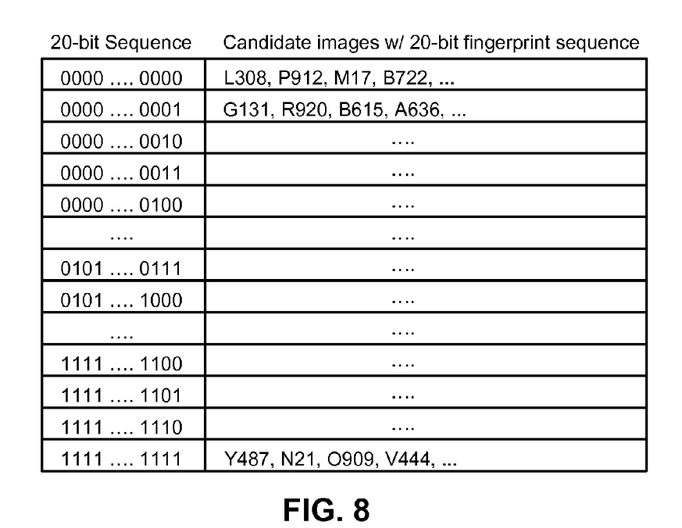
FIG. 8 is an example hash table identifying images with particular fingerprint sequences for a particular fingerprint segment, according to one embodiment.

FIG. 8 illustrates an example hash table identifying images with particular fingerprint sequences for a particular fingerprint segment, according to one embodiment. In one embodiment, the hash table of FIG. 8 may represent the first 20-bit segment of candidate image fingerprints. In this embodiment, the first 20-bit segment sequence of each candidate image fingerprint is determined, and the identity of each candidate image is inserted into the hash table according to the determined segment sequence of each candidate image.

In the embodiment of FIG. 8, the first 20-bits of the fingerprints of the candidate images represented by candidate image IDs "L308", "P912", "M17", and "B722" are determined to contain the sequence "00000000000000000000". Likewise, the first 20 bits of the fingerprints of candidate images "G131", "R920", "B615" and "A636" are "00000000000000000001", and the first 20 bits of the fingerprints of candidate images "Y487", "N21", "O909", and "V444" are "11111111111111111111". It should be noted that additional candidate images may contain these sequences, and additional candidate images may contain other sequences, but are not shown in FIG. 8 for the sake of simplicity.

Selection module 130 may comprise target image fingerprinting module 330, hash table look-up module 332, candidate image tally module 334, and hash table optimization module 336. Selection module 130 may retrieve the set of classifiers generated by classifier module 110 from classifiers storage module 340 and the set of hash tables generated by hash table module 120 from hash tables storage module 344.

Alternatively, selection module 130 may instead transmit a particular fingerprint segment sequence to hash tables storage module 344, and may receive a list of candidate image IDs in response.

Selection module 130 first receives a target image. As discussed above, a target image may be received from a locally stored image or video, may be retrieved from a image processing system 160 over a network 150, or may be uploaded by user of similar image selection system 100. Further, the received target image may be received from a video encoder requesting a prediction image to use in video encoding. Target image fingerprinting module 330 may use the retrieved set of classifiers on the target image to produce a target image fingerprint.

Hash table look-up module 332 splits the target image fingerprint into segments. In one embodiment, the target image fingerprint segments are the same length as the candidate image fingerprint segments used to create the hash tables, and the target image fingerprint is the same length as the candidate image fingerprints. For example, as discussed above, hash table module 120 may create a hash table for each 20-bit candidate image fingerprint segment; hash table look-up module 332 may similarly split the target image fingerprint into 20-bit segments. In this example, there may be 100 hash tables representing 20-bit fingerprint segments, and hash table look-up module 332 may split the target image fingerprint into 100 20-bit segments corresponding to the 100 hash tables.

Hash table look-up module 332 uses the target image fingerprint sequence for each fingerprint segment to retrieve a subset of candidate images with the same fingerprint sequence for each fingerprint segment from the retrieved hash tables. For instance, hash table look-up module 332 may retrieve a list of candidate image IDs from a hash table using the target image fingerprint sequence of the first 20-bit fingerprint segment. The retrieved candidate image IDs identify candidate images containing the same 20-bit sequence in the first 20-bit fingerprint segment. For example, if the first 20 bits of the target image fingerprint are "00110011001100110011", then the hash table representing the first 20-bit segments of the candidate image fingerprints may then return the IDs of all candidate images with fingerprint sequences of "00110011001100110011" in the first 20 bits.

Candidate image IDs may be retrieved for each target image fingerprint segment and from each hash table. In one embodiment, for 100 hash tables, 100 subsets of candidate image IDs are retrieved. The retrieved subsets of candidate image IDs are not mutually exclusive between hash tables. A candidate image ID common to more than one subset of retrieved candidate image IDs may indicate the candidate image fingerprint associated with the candidate image ID has more than one fingerprint segment sequence in common with the target image fingerprint. The candidate image tally module 334 may tally the number of common fingerprint segment sequences between particular candidate image fingerprints and the target image fingerprint for each received subset of candidate image IDs. In one embodiment, this comprises maintaining a candidate image ID tally table with each received candidate image ID, and each time a candidate image ID is received, incrementing a counter associated with that candidate image ID. For example, the first time candidate image ID "I816" is received, candidate image tally module 334 may create the entry "I816-1" in the candidate image ID tally table; the second time candidate image ID "I816" is received, candidate image tally module 334 may update the table entry to "I816-2", and so forth. An example of a tally table comprising retrieved subsets of candidate image IDs from hash tables for a given target image fingerprint is discussed below in greater detail with regards to FIG. 9.

Once every candidate image ID subset is received and tallied, candidate image tally module 334 selects one or more images similar to the target image based on the tally of common fingerprint segment sequences between the candidate image fingerprints and the target image fingerprint. In one embodiment, the candidate image with the most common fingerprint segment sequences is selected (the candidate image with the highest tally in the candidate image ID tally table). Similarly, more than one candidate image may qualify to be selected, for instance, the three candidate images with the most common fingerprint segment sequences. In one embodiment, a common fingerprint segment sequence threshold is determined, and all candidate images with more than the threshold common fingerprint segment sequences qualify to be selected. In one embodiment, if more than one candidate image qualifies to be selected, one candidate image may be selected from among the qualifying candidate image randomly or through some other means, or multiple candidate images may be selected.

Selection module 130 may output the selected candidate image, or may output the selected candidate image ID. In one embodiment, selection module 130 outputs the selected candidate image ID to image processing system 160, and the image processing system 160 retrieves the candidate image from candidate image store 342 or elsewhere. Likewise, selection module 130 may output multiple selected candidate images or selected candidate image IDs to image processing system 160, and image processing system 160 selects which candidate image to use.

Optionally, hash table optimization module 336 may improve the performance of retrieving subsets of candidate image IDs from the hash tables, and may improve the reliability of selecting an image similar to the target image. To do so, hash table optimization module 336 may create a hash table master table. In one embodiment, each row of the master table is assigned a hash table identification, and each column of the hash table is assigned a possible segment sequence. The entries for the master table may be the number of candidate images with each particular segment sequence. For example, for 2000-bit fingerprints, if hash tables are created for each 20-bit fingerprint segments, the master table would have 100 rows and $2^{20}$ columns, and each entry would represent the number of candidate images with a particular 20-bit sequence for the given 20-bit segment associated with the hash table. In such an example, for the hash table row representing the $80^{th}$ 20-bit fingerprint sequence, there may be an entry of "1752" in the column for "00110011001100110011", indicating that 1,752 candidate images fingerprints contain the sequence "00110011001100110011" in the $80^{th}$ 20-bit segment.

Hash table look-up module 332 may reference hash table optimization module 336 prior to retrieving the list of candidate images with the same fingerprint segment sequence as a target image fingerprint segment sequence from a hash table. In one embodiment, hash table look-up module 332 transmits the identity of the hash table and the segment sequence to be referenced to hash table optimization module 336. Hash table optimization module 336 may then reference the created hash table master table, and may output the number of candidate images with the particular segment sequence. In one embodiment, if the number of candidate images received by hash table look-up module 332 from hash table optimization module 336 for a particular fingerprint segment is above a determined threshold, the hash table for that fingerprint segment is not referenced, and the subset of candidate image IDs with the same segment sequence are not retrieved or considered by candidate image tally module 334. If the number of candidate images listed in the hash table master table is above the determined threshold, it may indicate that the classifiers for the particular segment are not discriminatory enough to consider the candidate images with the particular segment sequence. This may simultaneously save the processing power required to access hash tables and tally candidate images with particular segment sequences, and improve the quality of qualifying candidate images by relying on the most discriminatory classifiers.

It should be noted that the modules of FIG. 3 may be combined into fewer modules. For instance, classifier module 110 and hash table module 120 may be implemented in the same module, which may in turn be implemented in the same module as selection module 130. Likewise, storage module 140 may be implemented inside each of classifier module 110, hash table module 120 and selection module 130. In such instances, classifier module 110, hash table module 120 and selection module 130 may transmit the generated set of classifiers and set of hash tables among themselves, and each module may have access to the set of candidate images stored either internal or external to each module. Further, the sub-modules within classifier module 110, hash table module 120, selection module 130 and storage module 140 may be implemented in other modules or as standalone modules. For instance, a dedicated fingerprint module may implement the functionality of both fingerprint generation module 324 and target image fingerprinting module 330. Any combination of modules and sub-modules implemented the above-discussed functionality may be utilized.

Figure 4:
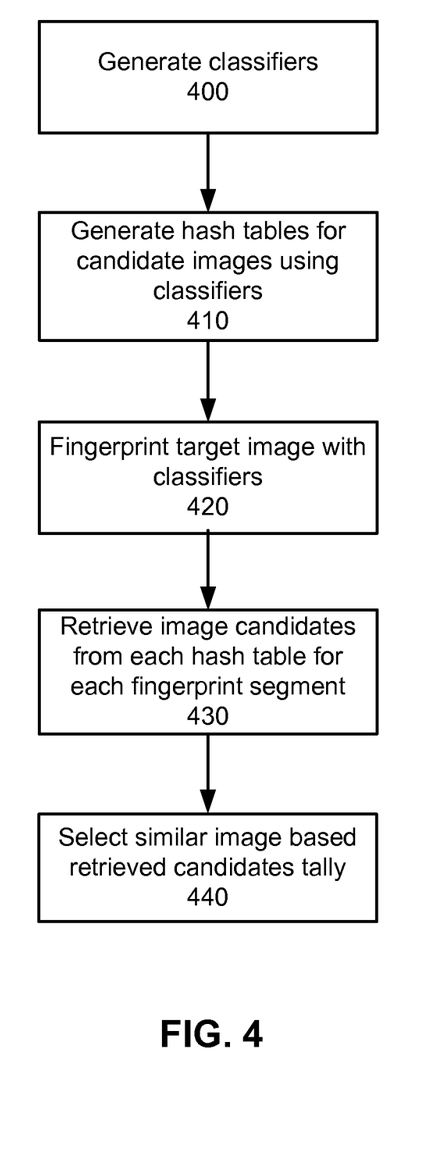
FIG. 4 is a flowchart illustrating an overview of the method of selecting an image similar to a target image according to one embodiment.

FIG. 4 is a flowchart illustrating an overview of the method of selecting an image similar to a target image according to one embodiment. Image classifiers are generated 400 and are used to generate 410 hash tables for candidate images. A target image is then fingerprinted 420 using the classifiers. Image candidates may be retrieved 430 from each hash table for each target image fingerprint segment. In one embodiment, image candidates are retrieved from a subset of the hash tables for a subset of target image fingerprint segments. Finally, an image similar to the target image is selected 440 based on a tally of the retrieved candidate images.

Figure 9:
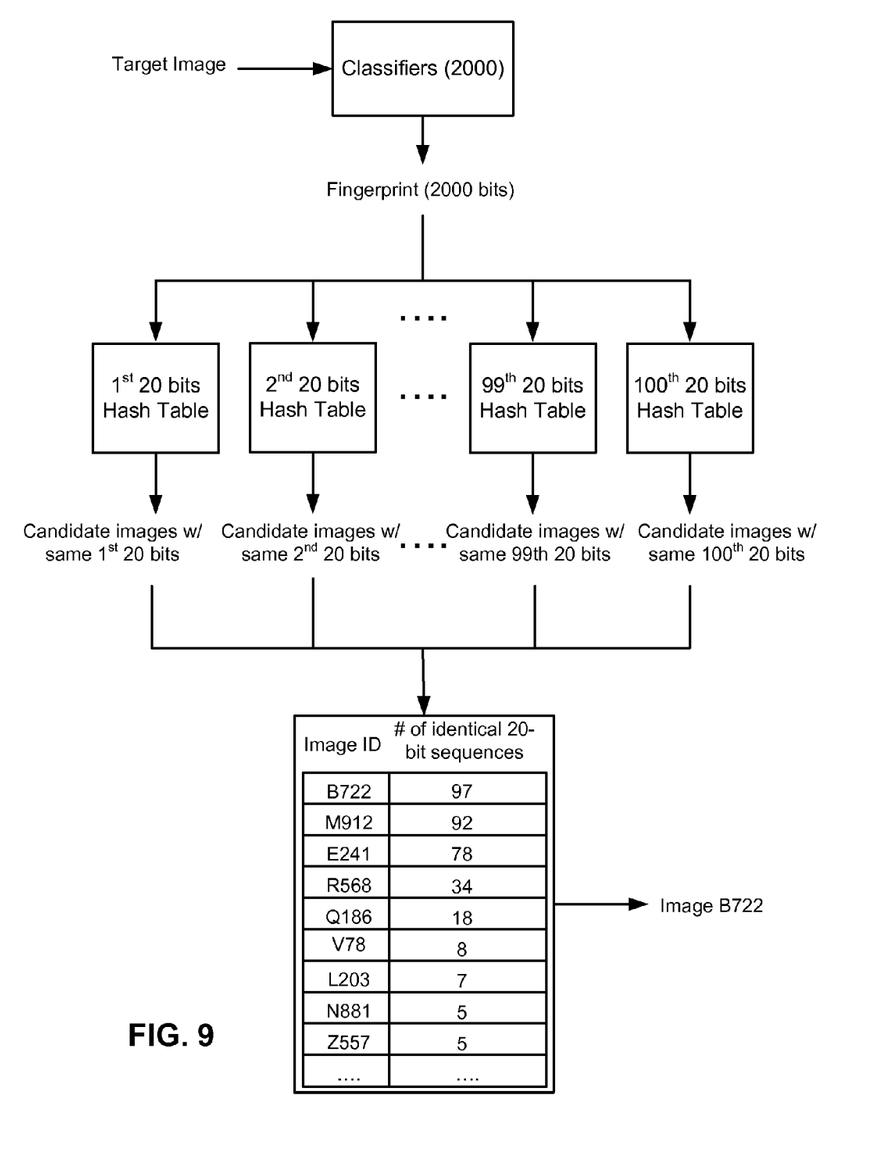
FIG. 9 is a flowchart illustrating an example of application of the method of FIG. 4, according to one embodiment.

FIG. 9 is a flowchart illustrating an example application of the method of FIG. 4, according to one embodiment. In the embodiment of FIG. 9, 2000 classifiers are generated and are applied to a target image, producing a 2000-bit target image fingerprint. 100 hash tables are generated, one for each 20-bit candidate image fingerprint segment. The first 20 bits of the target image fingerprint are transmitted to the hash table representing the first 20 bits of the candidate image fingerprints, the second 20 bits of the target image fingerprint are transmitted to the hash table representing the second 20 bits of the candidate image fingerprints, and so forth, for all 100 20-bit sequences of the target image fingerprint.

The candidate images with the same 20 bit segment sequences as the target image fingerprint are retrieved from the hash tables, and are inserted into a tally table. In the embodiment of FIG. 9, the candidate image with image ID "B722" has 97 20-bit segment sequences in common with the target image fingerprint. Likewise, candidate image "M912" has 92 20-bit segment sequences in common with the target image fingerprint, candidate image "E241" has 78 20-bit segment sequences in common with the target image fingerprint, and so forth. In the embodiment of FIG. 9, candidate image "B722" is selected and is outputted.

Figure 5:
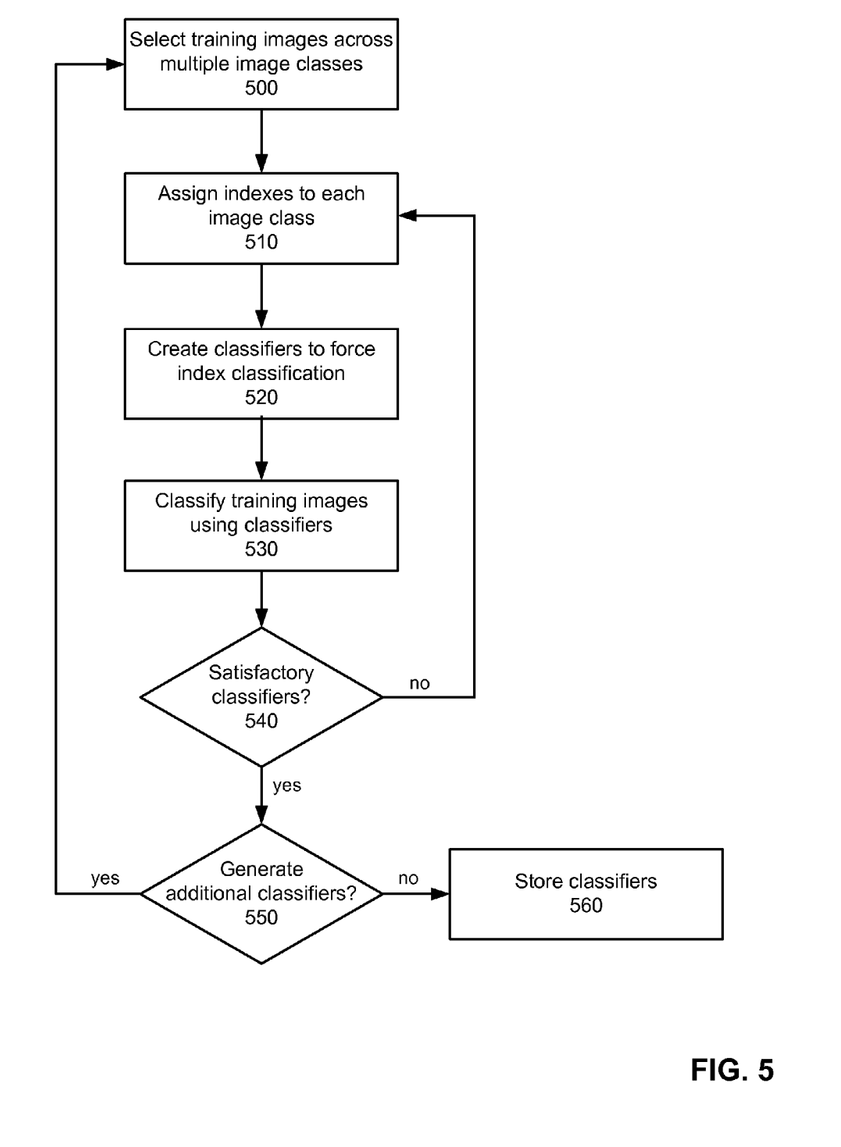
FIG. 5 is a flowchart illustrating a method of generating image classifiers according to one embodiment.

FIG. 5 is a flowchart illustrating a method of generating image classifiers according to one embodiment. In one embodiment, the step of generating 400 classifiers in FIG. 4 utilizes the method illustrated in FIG. 5. Alternatively, classifiers may be generated 400 using other methods, and the steps described in FIG. 5 may be combined, or may occur in parallel. For instance, multiple subsets of classifiers may be generated simultaneously, rather than serially as described.

Training images are selected 500, the training images belonging to multiple image classes. In one embodiment, 10 images are selected for each of 1024 image classes. Indexes are assigned 510 to each image class. The indexes initially may be randomly assigned, and subsequently may be assigned using a combinatorial optimization problem solving algorithm and a confidence table as discussed above with regards to FIG. 3. A subset of classifiers is created 520 to attempt to force classification of the assigned image class index. In one embodiment, image class indexes are 10 bits in length, and 10 classifiers are created 520.

The training images are classified 530 using the created classifiers. In one embodiment, this classification results in a 10-bit fingerprint for each training image. Next, it is determined 540 whether or not the classifiers are satisfactory. The classifiers may be satisfactory if a particular metric of classification is met. In one embodiment, this determination comprises building a confidence table as described above with regards to FIG. 3 and determining whether or not to reassign image class indexes. If less than a threshold fraction of image class indexes are reassigned, it may be determined that the classifiers are satisfactory. Alternatively, if image class indexes have been reassigned more than a threshold number of times, it may be determined that the classifiers are satisfactory.

If the classifiers are not determined to be satisfactory, indexes are reassigned 510 to each image class, new classifiers are created 520 and the process repeats. If the classifiers are determined to be satisfactory, it is determined 550 whether or not to generate additional subsets of classifiers. In one embodiment, if under a threshold number of classifiers is generated, it is determined that additional classifiers will be generated, and additional training images are selected 500. Alternatively, if over a threshold number of classifiers is generated, it is determined that no additional classifiers will be generated, and the generated set of classifiers is stored 560. In one embodiment, the generated subsets of classifiers are stored each time a subset of classifiers is determined 540 to be satisfactory.

Figure 6:
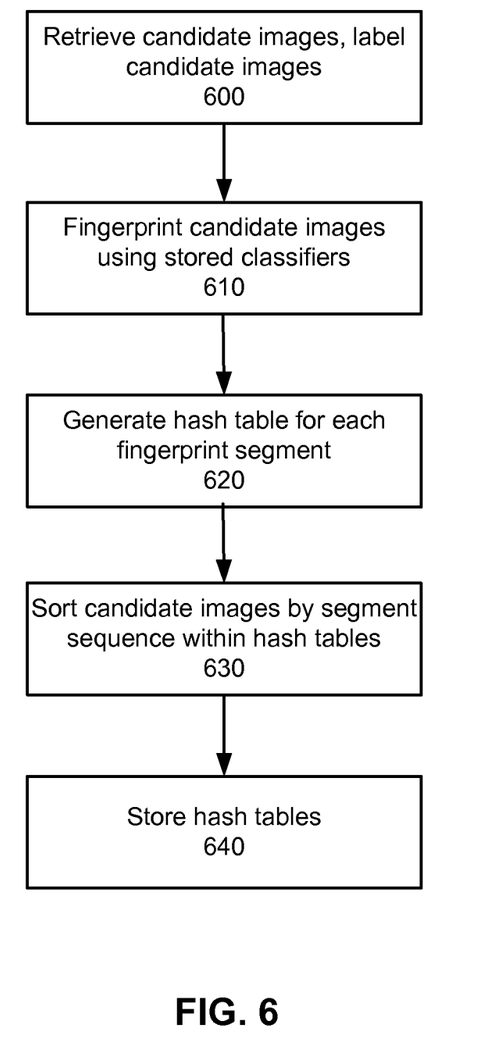
FIG. 6 is a flowchart illustrating a method of generating hash tables organizing test images by classifier-produced fingerprint segments, according to one embodiment.

FIG. 6 is a flowchart illustrating a method of generating hash tables organizing test images by classifier-produced fingerprint segments, according to one embodiment. In one embodiment, the step of generating 410 hash tables in FIG. 4 utilizes the method illustrated in FIG. 6.

Candidate images are retrieved 600 and labeled with a candidate image ID. The stored classifiers generated by step 400 are retrieved and used to fingerprint 610 the retrieved set of candidate images. A hash table is generated 620 for each candidate image fingerprint segment. As discussed above with regards to FIG. 3, in one embodiment, this comprises generating one hash table for each 20-bit fingerprint segment. The candidate images are sorted 630 into each hash table. In one embodiment, sorting comprises inserting a candidate image ID into each hash table based on the segment sequence of the candidate image fingerprint for the associated fingerprint segment represented by the hash table, for each image. The hash tables are then stored 640.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention. In particular, the example embodiments of FIGS. 8-10 are intended only to be illustrative, and are not intended to be limited in any way.

The invention claimed is:

1. A method comprising:
   generating, by a device comprising a processor, a set of image classifiers that classify images according to characteristics of the images, wherein the generating comprises:
      establishing a set of training images comprising images from one or more image classes;
      assigning an image class index of one or more image class indexes to an image class of the one or more image classes; and
      iteratively generating the set of image classifiers, wherein the set of image classifiers classify a training image of the set of training images with the image class index, and wherein the image class corresponds to the training image;
   classifying a set of candidate images using the set of image classifiers to generate fingerprints for the set of candidate images, wherein a fingerprint comprises a plurality of segments;
   representing the plurality of segments of the fingerprints for the set of candidate images using a plurality of hash tables;
   classifying a target image using the set of image classifiers to generate a fingerprint of the target image;
   comparing a plurality of segments of the fingerprint of the target image with the plurality of segments of the fingerprints for the set of candidate images using the plurality of hash tables; and
   selecting a candidate image having a defined level of similarity with the target image based on the comparing.

2. The method of claim 1, wherein the iteratively generating the set of image classifiers comprises:
   for an iteration:
      generating one or more subset classifiers forming a subset of the set of image classifiers;
      classifying the training images in the set of training images using the one or more subset classifiers to generate fingerprints for the training images;
      determining one or more measures of confidence between one or more of the image classes and one or more of the image class indexes;
      determining whether to reassign the one or more image class indexes to the one or more image classes based on the one or more measures of confidence; and
      reassigning the one or more image class indexes to the one or more image classes based on the one or more measures of confidence, wherein the reassigning is based on a determination to reassign the one or more image class indexes.

3. The method of claim 2, wherein a measure of confidence of the one or more measures of confidence represents confidence that an image class should be assigned one of the one or more image class indexes.

4. The method of claim 1, wherein the image classifiers are binary classifiers and wherein the classifying the set of candidate images using the set of image classifiers to generate fingerprints for the candidate images comprises:
   classifying a candidate image using the binary classifiers in the set, one or more of the binary classifiers producing a binary value based on classification.

5. The method of claim 4, further comprising:
   concatenating binary values produced by the binary classifiers to generate the fingerprint for the candidate image.

6. The method of claim 1, wherein the candidate image has an associated candidate image identifier (ID) and the fingerprint of the candidate image comprises a predetermined number of segments, and wherein representing segments of the fingerprints for the candidate images using a plurality of hash tables comprises:
   establishing a predetermined number of hash tables, a hash table corresponding to a candidate image fingerprint segment, and the hash table having one or more entries corresponding to possible values of segments of fingerprints for the set of candidate images; and
   for the candidate image of the set of candidate images, storing the candidate image identifier in the hash table corresponding to the candidate image fingerprint segment at a hash table entry corresponding to a value of the candidate image fingerprint segment.

7. The method of claim 6, wherein the segment of the fingerprint for the target image corresponds to a segment of the fingerprints for the set of candidate images, and wherein comparing segments of the fingerprint for the target image with the segments of the fingerprints for the set of candidate images represented by the hash tables comprises retrieving the candidate image identifiers of set of candidate images with fingerprint segment values identical to corresponding segment values of the fingerprint for the target image from the hash tables.

8. The method of claim 7, wherein selecting an image comprises:
   tallying a number of times a candidate image identifier is retrieved in response to retrieving the candidate image identifiers; and
   selecting the candidate image with a highest candidate image identifier tally.

9. A device, comprising:
   a processor, communicatively coupled to a memory, that executes or facilitates execution of instructions to at least:
      generate a set of image classifiers for classifying images according to characteristics of the images, wherein generation of the set of image classifiers comprises:
         establishment of a set of training images comprising images from multiple image classes;
         assignment of image class indexes to the multiple image classes; and
         iterative generation of the set of image classifiers, wherein the set of image classifiers, in response to classifying a training image, match classification of the training image to the image class index corresponding to an image class of the training image; and
      classify a set of candidate images using the set of image classifiers to generate fingerprints for the set of candidate images, a fingerprint comprising a plurality of segments;
      represent the segments of the fingerprints for the set of candidate images using hash tables;
      classify the target image using the set of image classifiers to generate a fingerprint for the target image;

compare segments of the fingerprint for the target image with segments of the fingerprints of the candidate images using the hash tables; and select a candidate image having a defined level of similarity with the target image based on the comparison.

10. The device of claim 9, wherein the iterative generation of the set of image classifiers comprises:

for an iteration:
generation of subset classifiers forming a subset of the set of image classifiers;
classification of images in the set of training images using the subset classifiers to generate fingerprints for the training images;
determination of measures of confidence between image classes and image class indexes;
determination of whether to reassign image class indexes to each image class based on the measures of confidence; and
responsive to a determination to reassign image class indexes, reassignment of image class indexes to each image class based on the measure of confidence.

11. The device of claim 10, wherein a measure of confidence of the measures of confidence represents confidence that an image class of the image classes should be assigned a particular image class index.

12. The device of claim 9, wherein the image classifiers are binary classifiers and wherein classification of the set of candidate images using the set of image classifiers to generate fingerprints for the candidate images comprises:

classification of a candidate image using the binary classifiers in the set, wherein a binary classifier of the binary classifiers generate a binary value responsive to the classification; and
concatenation of binary values generated by the binary classifiers to generate the fingerprint for the candidate image.

13. The device of claim 9, wherein the candidate image has an associated candidate image identifier (ID), wherein a candidate image fingerprint comprises a pre-determined number of segments, and wherein representation of the segments of the fingerprints for the candidate images using hash tables comprises:

establishment of a pre-determined number of hash tables, a hash table of the hash tables corresponding to a candidate image fingerprint segment, and the hash tables having entries corresponding to possible values of segments of fingerprints for the candidate images; and
for the candidate image, storage of the candidate image identifier in the hash table corresponding to the candidate image fingerprint segment at the hash table entry corresponding to a value of the candidate image fingerprint segment.

14. The device of claim 13, wherein the segment of the fingerprint for the target image corresponds to a segment of the fingerprints for the candidate images, and wherein comparison of segments of the fingerprint for the target image with the segments of the fingerprints for the candidate images represented by the plurality of hash tables comprises retrieval of the candidate image identifiers of candidate images with fingerprint segment values substantially identical to corresponding segment values of the fingerprint for the target image from the hash tables.

15. The device of claim 14, wherein selection of an image comprises:

a tallying of a number of times the candidate image identifier is retrieved in response to retrieving the candidate image identifiers.

16. The device of claim 15, wherein selection of the image further comprises:

selection of the candidate image with a highest candidate image identifier tally.

17. A non-transitory computer-readable storage medium storing instructions that, in response to execution, cause a device comprising a processor to perform operations, comprising:

generating a set of image classifiers for classifying images according to characteristics of the images, wherein the generating a set of image classifiers comprises:
establishing a set of training images comprising images from multiple image classes;
assigning an image class index to respective ones of the multiple image classes; and
iteratively generating the set of image classifiers, wherein the image classifiers, in response to classifying a training image, match classification of the training image to the image class index corresponding to an image class of the training image; and
representing the segments of the fingerprints for the candidate images using a plurality of hash tables;
classifying the target image using the set of image classifiers to generate a fingerprint for the target image;
comparing segments of the fingerprint of the target image with segments of the fingerprints of the candidate images using the plurality of hash tables; and
selecting a candidate image having a defined level of similarity with the target image based on the comparison.

18. The non-transitory computer-readable storage medium of claim 17, wherein the iteratively generating the set of image classifiers comprises:

for an iteration:
generating subset classifiers forming a subset of the set of image classifiers;
classifying images in the set of training images using the subset classifiers to generate fingerprints for the training images;
determining measures of confidence between image classes and image class indexes;
determining whether to reassign the image class indexes to an image class of the image classes based on the measures of confidence; and
responsive to a determination to reassign the image class indexes, reassigning the image class indexes to the image classes based on the measures of confidence.

19. The non-transitory computer-readable storage medium of claim 18, wherein a measure of confidence of the measures of confidence represents confidence that an image class should be assigned a particular image class index.

20. The non-transitory computer-readable storage medium of claim 17, wherein the image classifiers are binary classifiers and wherein classifying the candidate images using the image classifiers to generate fingerprints for the candidate images comprises:

classifying the candidate image using the binary classifiers, wherein a binary classifier of the binary classifiers generates a binary value responsive to classification.

21. The non-transitory computer-readable storage medium of claim 20, wherein the operations further comprise:

concatenating binary values produced by the binary classifiers to generate the fingerprint for the candidate image.

22. The non-transitory computer-readable storage medium of claim 17, wherein the candidate image has an associated candidate image identifier (ID), wherein a candidate image fingerprint comprises a pre-determined number of segments, and representing the segments of the fingerprints for the candidate images using hash tables comprises:

establishing the pre-determined number of hash tables, wherein a hash table of the hash tables corresponds to a candidate image fingerprint segment, and a hash table of the hash tables has entries corresponding to possible values of segments of fingerprints for the candidate images; and for a candidate image, storing the candidate image identifier in the hash table corresponding to the candidate image fingerprint segment at a hash table entry corresponding to a value of the candidate image fingerprint segment.

23. The non-transitory computer-readable storage medium of claim 22, wherein the segment of the fingerprint for the target image corresponds to a segment of the fingerprints for the candidate images, and wherein comparing segments of the fingerprint for the target image with the segments of the fingerprints for the candidate images represented by the hash tables comprises retrieving the candidate image identifiers of candidate images with fingerprint segment values identical to corresponding segment values of the fingerprint for the target image from the hash tables.

24. The non-transitory computer-readable storage medium of claim 23, wherein selecting an image comprises:

tallying a number of times a candidate image identifier is retrieved in response to retrieving the candidate image identifiers; and selecting the candidate image with a highest candidate image identifier tally.

* * * * *